US009669562B2

(12) United States Patent
Ketonen

(10) Patent No.: US 9,669,562 B2
(45) Date of Patent: Jun. 6, 2017

(54) HYDRAULIC ARRANGEMENT IN CONNECTION WITH A CUTTING DEVICE AND A CORRESPONDING METHOD

(76) Inventor: Lauri Ketonen, Kristiinankaupunki (FI)

( * ) Notice: Subject to any disclaimer, the term of this patent is extended or adjusted under 35 U.S.C. 154(b) by 890 days.

(21) Appl. No.: 14/110,519

(22) PCT Filed: Apr. 13, 2012

(86) PCT No.: PCT/FI2012/050366
§ 371 (c)(1),
(2), (4) Date: Oct. 8, 2013

(87) PCT Pub. No.: WO2012/143604
PCT Pub. Date: Oct. 26, 2012

(65) Prior Publication Data
US 2014/0027019 A1    Jan. 30, 2014

(30) Foreign Application Priority Data

Apr. 20, 2011   (FI) .................................... 20110139
May 4, 2011   (FI) .................................... 20115422

(51) Int. Cl.
*B27B 17/08*       (2006.01)
*A01G 23/091*     (2006.01)
*A01G 23/08*      (2006.01)

(52) U.S. Cl.
CPC ............. *B27B 17/08* (2013.01); *A01G 23/08* (2013.01); *A01G 23/091* (2013.01)

(58) Field of Classification Search
CPC ... B27B 17/08; B27B 17/0058; A01G 23/091; A01G 23/08; Y10T 83/7114; Y10T 83/04; Y10T 83/7076; Y10T 83/148; B23D 59/001

USPC .... 83/13, 765, 800, 801, 74, 789, 796, 39.1, 83/72, 574; 144/336, 34.1, 356
See application file for complete search history.

(56) References Cited

U.S. PATENT DOCUMENTS 4,358,974 A * 11/1982 Sakurai ................ B23D 55/088
                                                        700/175
6,041,683 A *  3/2000 Timperi .................. A01G 23/08
                                                        144/34.1
(Continued)

FOREIGN PATENT DOCUMENTS

WO       99/12410       3/1999
WO       01/84910      11/2001
WO     2004/083652     9/2004

OTHER PUBLICATIONS

International Search Report in PCT/FI2012/050366.

*Primary Examiner* — Ghassem Alie
(74) *Attorney, Agent, or Firm* — Fildes & Outland, P.C.

(57) ABSTRACT

A hydraulic arrangement and method in connection with a cutting device includes a hydraulic input line, a hydraulic motor, a return line from the hydraulic motor, a hydraulic cylinder for pressing the cutting device, a feed line for the hydraulic cylinder, connected in parallel with the hydraulic motor to the input line, and a directional control valve and a pressing line and a lifting line. The hydraulic arrangement further includes a throttle for throttling the flow exiting from the hydraulic motor in the return line, and a pressure valve located between the said pressing line and the pressure side of the throttle, for controlling the hydraulic cylinder on the basis of the speed of rotation of the hydraulic motor.

12 Claims, 2 Drawing Sheets

(56) References Cited

U.S. PATENT DOCUMENTS

| | | | |
|---|---|---|---|
| 7,017,460 B2* | 3/2006 | Virvalo | A01G 23/091 83/13 |
| 7,451,790 B2* | 11/2008 | Vallebrant | B27B 17/08 144/34.1 |
| 7,784,391 B2* | 8/2010 | Vallebrant | B27B 17/08 91/418 |
| 9,133,983 B2* | 9/2015 | Kettunen | F16N 7/38 |
| 2004/0020561 A1 | 2/2004 | Brown | |

\* cited by examiner

HYDRAULIC ARRANGEMENT IN CONNECTION WITH A CUTTING DEVICE AND A CORRESPONDING METHOD

TECHNICAL FIELD

The present invention relates to a hydraulic arrangement in connection with a cutting device, in which the hydraulic arrangement includes
- a hydraulic input line,
- a hydraulic motor connected to the said hydraulic input line for operating the cutting device,
- a return line from the hydraulic motor,
- a hydraulic cylinder for pressing the cutting device against the tree to be cut,
- a feed line for the hydraulic cylinder, connected in parallel with the hydraulic motor to the input line, and
- a directional control valve located on the feed line of the hydraulic cylinder,
- a pressing line and a lifting line for guiding the flow from the said directional control valve to the hydraulic cylinder, guiding the flow as selected either to the side of the piston rod of the hydraulic cylinder or to the cylinder side.

In addition, the invention also relates to a method in the hydraulic arrangement, in connection with the cutting device.

BACKGROUND OF THE INVENTION

According to the prior art, a cutting saw in a multi-purpose machine, especially in harvester and processor multi-purpose machines, is formed of a hydraulic motor and a cutting flange or cutting disc. The drive sprocket of the hydraulic motor rotates an endless chain around a flange, and the feed of the flange against the tree generally takes place by means of a hydraulic cylinder. In a disc saw, the motor rotates a disc directly or with the aid of a ring gear. In these too, the feed against the tree takes place by means of a hydraulic cylinder.

A problem in devices according to the prior art is the difficulty of adjusting the feed. The size and hardness of wood varies and additionally, for example, knots are extremely hard. In addition, the condition of the blade of the cutting device is decisive. A sharpened blade will cut considerably better than one in poor condition.

Nowadays, the simplest practicable control is based on a throttle installed on the motor's return line. While the motor rotates, pressure to the hydraulic cylinder intended for the flange feed is obtained with the aid of the throttle. The higher the speed of the motor, the greater is the feed pressure. When the motor stops, the pressure effect ends.

In order to operate, such a system demands that the return oil be throttled to about 50 bar. When the operating pressure is about 200 bar, 25% of the output of the saw motor will be lost as heat. The feed control can also be performed on the pressure side of the motor. This generally takes place with the aid of a pressure-reduction valve and a valve throttling the cylinder's speed. This works well in standard conditions, but when the hardness of the wood increases the chain tends to stop, as the feed pressure cannot take the rotation of the motor into account. In order to get a cutting saw to operate, the throttle is used to adjust a suitable approach speed for the cutting device while the pressure during sawing is regulated by a pressure valve. In practice, it is extremely difficult to adjust the throttle with hard wood and a worn cutting device.

The solution generally used is to over-dimension the hydraulic motor, i.e. in practice the dimensioning of the hydraulic motor is doubled.

A sufficient pressure is required for the proper cutting of wood (for example, time, no tearing). In theory, the diameter of the cylinder of the feed device could be increased, but this would lead to large flow amounts in the cylinder line, as normal sawing lasts for about 1-2 s.

A system is known from publication WO 01/84910, in which the operation of the hydraulic cylinder and the cutting saw is controlled with the aid of a computer. However, such a system is extremely labourious and expensive to implement, as the system requires several measuring sensors and a computer.

SUMMARY OF THE INVENTION

The hydraulic arrangement according to the invention is intended to create a simpler hydraulic arrangement than the prior art in connection with a cutting saw, with the aid of which the control between the cutting saw and the cylinder feeding the cutting saw can be implemented economically and simply. The characterizing features of the hydraulic arrangement according to the invention are stated in the accompanying Claim 1. The method according to the invention is intended to create a simpler method than the prior art in a hydraulic arrangement in connection with a cutting saw, with the aid of which the cutting saw and the cylinder feeding the cutting saw can be controlled economically and simply. The characteristic features of the method according to this invention are stated in the accompanying Claim 13.

In the hydraulic arrangement according to the invention, the aforementioned double dimensioning and throttling of the saw-motor's return line are exploited. In all conditions, the feed pressure can be about 50% of the optimal sawing pressure. The throttling need be only 50% of that used previously. Whereas previously the output loss was about 25%, now it is only 12.5%. The pressure caused by the throttling of the return line is led to the control line of the pressure valve of the cylinder of the feed device of the cutting device.

In other words, the intention of the hydraulic arrangement according to the invention can be achieved by means of a hydraulic arrangement in connection with a cutting device, in which the hydraulic arrangement further includes a throttle for throttling the flow in the return line exiting the hydraulic motor, and a pressure valve located in connection with the pressure line and/or lifting line, for controlling the hydraulic cylinder on the basis of the rotation speed of the hydraulic motor. The hydraulic arrangement includes, in addition, a hydraulic input line, a hydraulic motor connected to the hydraulic input line for operating the cutting device, and a return line from the hydraulic motor. The hydraulic arrangement also includes a hydraulic cylinder for pressing the cutting device against the tree to be cut, a hydraulic-cylinder feed line connected in parallel with the hydraulic motor to the input line, and a directional control valve located on the feed line of the hydraulic cylinder. In addition, the hydraulic arrangement includes a pressing line and a lifting line for leading the hydraulic flow from the directional control valve to the hydraulic cylinder, thus directing the flow, as selected, either to the side of the piston rod of the hydraulic cylinder, or to the side of the cylinder. With the aid of the pressure valve, the construction of the hydraulic arrangement is made considerably simple and economical to implement.

According to one embodiment, the nominal pressure of the throttle is 30-65%, preferably 40-60% of the regulating value of the pressure-reduction valve. The losses taking place in the throttle are then reduced to about one half.

The feed line of the hydraulic cylinder preferably includes a directional control valve, for controlling the hydraulic cylinder. With the aid of the directional control valve, the hydraulic cylinder can be operated in both directions, with the aid of pressure, which will make it easier, for example, to detach the cutting device from a tree.

The directional control valve can be located on the hydraulic cylinder's feed line, before the pressure valve. The directional control valve will then have no effect on the operation of the pressure valve.

The pressure valve is preferably arranged to open when the pressure decreases below a limit threshold in the hydraulic motor's return line. The cylinder responsible for the feed of the cutting device then shortens and the cutting flange rises, when the hydraulic motor is able to once again rotate faster and the pressure in the hydraulic motor return line once again increases.

According to one embodiment, the volume flow directed to the hydraulic cylinder feed line is 5-30%, preferably 10-15% of the total volume flow of the hydraulics' input line. The pressure in the hydraulic cylinder's feed line can be 15-35%, preferably 20-30% of the pressure of the hydraulics' input line. Thus, a sufficient volume flow and pressure remains for the hydraulic cylinder to ensure effective operation.

According to one embodiment, the pressure valve is a pressure limit valve or a pressure reduction valve. The pressure valve can be a slide valve or alternatively a poppet valve.

In practice, the initial pressure is adjusted to about 25 bar, when the cutting flange will operate reasonably. When the hydraulic motor rotates, the pressure arising from the throttling affects the opposite side of the seat of the pressure valve, thus increasing the opening of the valve by a corresponding pressure. In the case of a pressure-reduction valve, the pressure to be regulated increases correspondingly.

The reaction of the valves is very rapid, so that sawing takes place softly. If the saw seeks to stop, the pressure decreases correspondingly, so that the motor can still rotate the cutting device. Once sawing has ended, the flange rises as the pressure acts on the other side of the cylinder.

According to one embodiment, the pressure valve is located between the return line and the pressure side of the throttle.

According to another embodiment, the pressure valve is located between the intermediate line, the pressing line, and the pressure side of the throttle.

The intention of the method according to the invention can be achieved by means of the method in a hydraulic arrangement in connection with a cutting device, in which method the cutting device is driven by a hydraulic motor and the cutting device is pressed or lightened relative to the tree being cut, with the aid of a hydraulic cylinder. In the method, hydraulic oil is fed through a directional control valve to the hydraulic cylinder as selected, either to the side of the piston of the hydraulic cylinder, or to the cylinder side, in order to press or lift the cutting device, and the feed of the hydraulic cylinder is controlled on the basis of the rotation speed of the hydraulic motor. Further, in the method, the flow exiting from the hydraulic motor is throttled, in order to create a pressure in the return line of the hydraulic motor and the pressure in the return line before throttling is used for controlling the pressing of the hydraulic cylinder for the lightening of the cutting device when the rotation speed decreases. Thus, the control of the hydraulic cylinder can be implemented entirely without electrical control means, using only conventional hydraulics components. Such a solution is economical to implement and simple to maintain.

BRIEF DESCRIPTION OF THE DRAWINGS

In the following, the invention is described in detail with reference to the accompanying drawing showing one embodiment of the invention, in which.

DETAILED DESCRIPTION OF THE INVENTION

Figure 1:
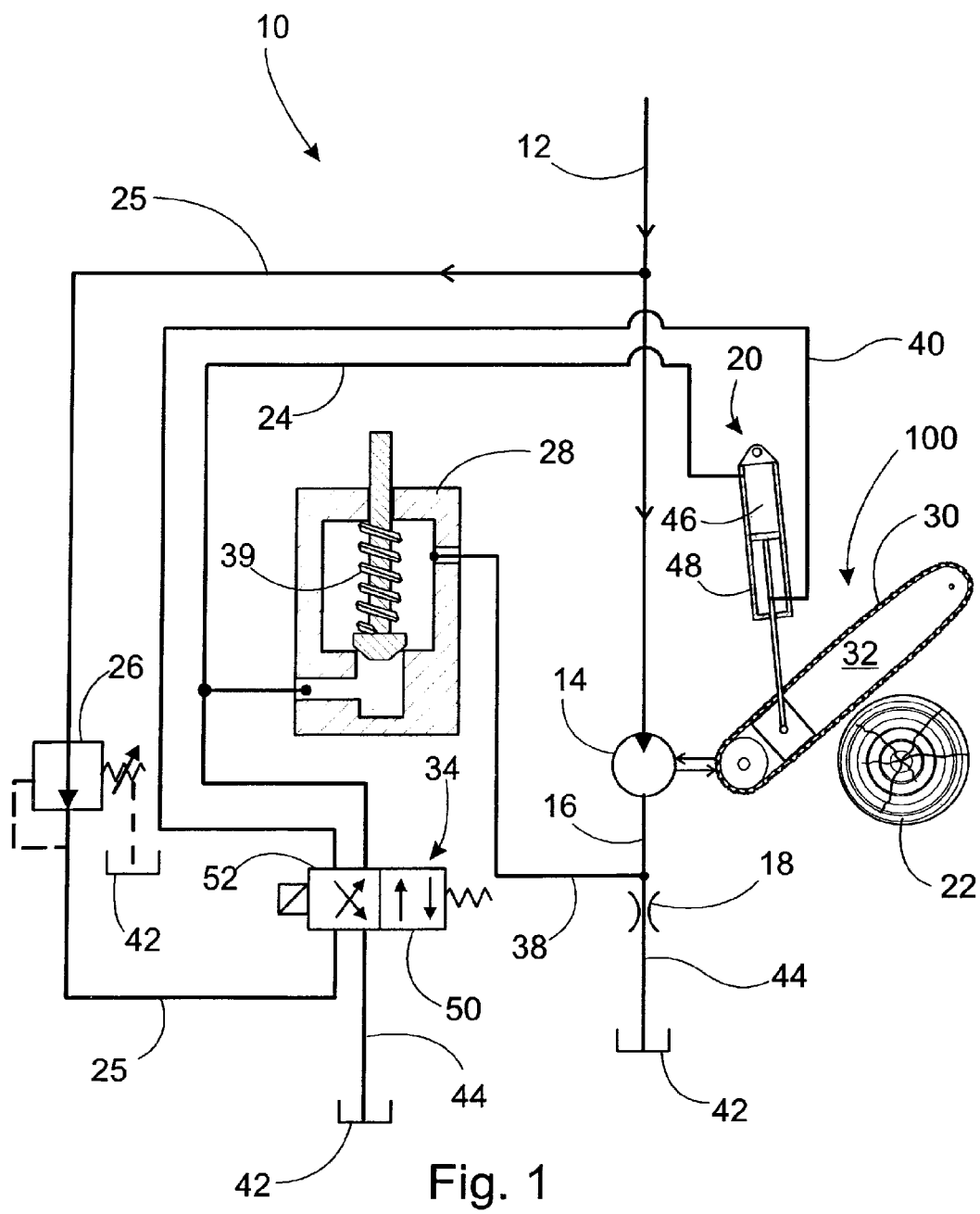
FIG. 1 shows a schematic diagram of the hydraulic arrangement according to the invention.

According to FIG. 1, the hydraulic arrangement 10 according to the invention includes cutting device 100, a hydraulic input line 12, a hydraulic motor 14 for rotating the cutting device 100, a return line 16 from the hydraulic motor 14, and a throttle 18 for throttling the flow exiting from the hydraulic motor 14 in the return line 16. Further, the hydraulic arrangement 10 includes a hydraulic cylinder 20 for pressing the cutting device 100 against the tree 22 to be cut, a hydraulic cylinder 20 feed line 25 connected in parallel with the hydraulic motor 14 to the input line 12, and a pressure-reduction valve 26 installed on the hydraulic cylinder 20 feed line 25. In addition to this, the hydraulic arrangement 10 further includes a pressure valve 28 between the hydraulic cylinder 20 pressing line 24 and the hydraulic motor 14 return line 16, for controlling the hydraulic cylinder 20 on the basis of the rotation speed of the hydraulic motor 14.

The following describes the operation of one hydraulic arrangement according to a preferred embodiment. At the same time, the stages of the method according to the invention are also described. The hydraulic motor 14, i.e. in this case the saw motor 14, moves the cutting device 100, i.e. the cutting saw's 100 chain 30 around the cutting flange 32. The hydraulic cylinder 20, i.e. the cylinder 20 pushes the cutting flange 32 together with the chain 30 towards the tree 22. The hydraulic flow in the input line 12 can be, for example, 150 l/min. About 20 l/min of the volume flow of the hydraulic oil flowing in the input line can go to the feed line 25 of the cylinder 20. Before the directional control valve 34 in the feed line 25 there can be a pressure-reduction valve 26. Its regulating value can be about 50 bar. With the aid of the directional control valve 34, the cutting saw's 100 cylinder 20 is controlled, by means of which the cutting flange 32 can be raised and lowered. With the aid of the directional control valve 34, the flow in the feed line 25 is directed, according to the situation, either to the pressing line 24, or to the lifting line 40 connected to the lower end 48 of the cylinder 20. The pressing line 24 and the lifting line 40 are connected to the feed line 25 through the directional control valve 34. From the directional control valve 34, there is a tank line 44, through which the hydraulic oil is directed back to the oil tank 42.

The directional control valve 34 can be, for example, a 2/2 valve, in which one position is a direct-flow position 50 and the other position is a cross-flow position 52. When there is no current in the directional control valve 34, the directional control valve 34 is in the direct flow position 50, the oil is directed to the lower end 48 of the cylinder 20 and the cutting flange 32 will seek to rise out of the tree 22. Though the saw motor 14 rotates and the pressure in the control line 38 has increased with the aid of the throttle 18, hydraulic oil does not flow through the pressure valve 28, nor does pressure increase in the pressing line 24 of the cylinder 20.

When the position of the directional control valve 34 is changed to the cross-flow position 52, a pressure of about 50 bar begins to affect the pressure valve 28 through the intermediate line 31. The same pressure also affects the upper end 46 of the cylinder 20 with the aid of the pressing line 24 and presses the cutting saw 100 against the tree 22 with the aid of the cylinder 20. The regulating value of the pressure valve 28 can be, for example, about 25 bar, depending on the pressure level to be used in the arrangement. However, the pressure seeks to discharge through the pressure valve 28 and the control line 38 through the throttle 18 to the oil tank 42. If the saw motor 14 is rotating rapidly, the pressure in the control line 38, with the aid of the throttle 18, will be about 25 bar. The nominal pressure of the throttle 18 can be 30-65%, preferably 40-60% of the regulating value of the pressure-reduction valve 26. Together with the aid of the force of the spring 39 of the pressure valve 28, a sufficient pressure arises to resist the opening of the pressure valve.

Thus, oil does not go through the pressure valve 28 from the pressure line 24 side of the cylinder 20. In the pressing line 24, the pressure remains at about 50 bar and sawing is effective.

If, on the other hand, the saw motor 14 stops by catching on the tree 22, the pressure before the throttle 18 decreases and at the same time the pressure in the control line 38 drops below the limit threshold. The pressure in the control line is insufficient to withstand the pressure of 50 bar acting on the side of the pressing line 24 of the cylinder 20, in which case the pressure valve 28 opens and at the same time the pressure in the pressing line 24 drops to about 25 bar. Thus the cylinder 20 lightens the pressure of the cutting device 32 on the tree and the saw motor 14 can again rotate. This state of equilibrium is repeated for the entire duration of the sawing. The pressure valve 28 can also be a pressure-reduction valve. In this case, the limit threshold of the pressure valve 28 will be 25 bar or less. The term limit threshold refers to the minimum pressure in the control line 38 at which the pressure valve 28 remains closed. The flow of hydraulic oil flowing through the pressure valve is not able to compensate for the reduction in volume flow at the throttle due to the slowing of the saw motor, nor does the pressure on the pressure side of the throttle thus rise before the cutting flange has been lightened and the saw motor once again begins to rotate more rapidly. The pressure on the exit side of the saw motor depends on the speed of rotation of the saw motor, i.e. when the saw motor rotates slowly the pressure on the exit side is low, and vice versa.

Figure 2:
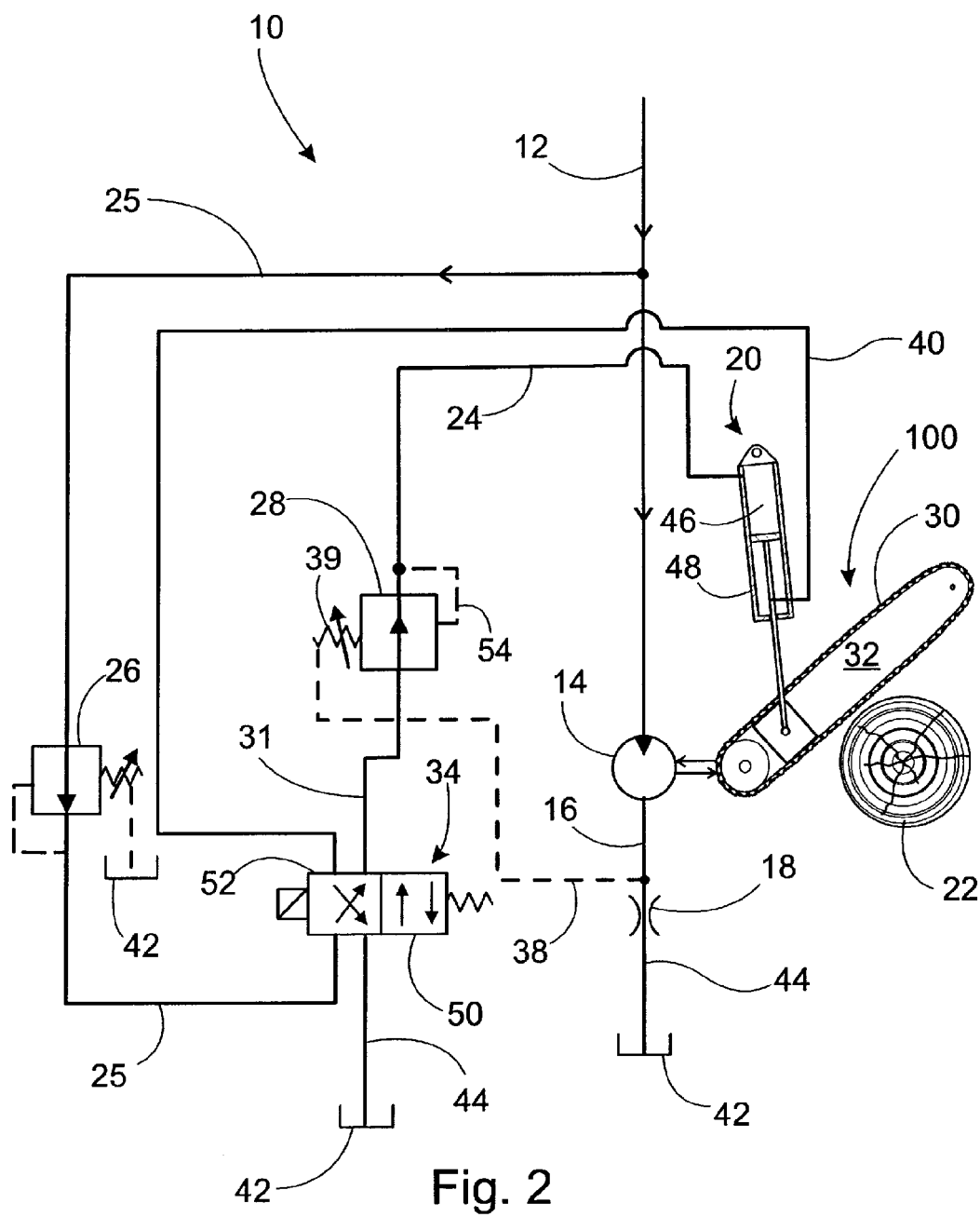
FIG. 2 shows a schematic diagram of the hydraulic arrangement according to the invention, when the pressure valve is a general pressure-reduction valve.

FIG. 2 shows the arrangement according to the invention, when a general pressure-reduction valve is used as the pressure valve 28. The pressure-reduction valve used can be a perfectly ordinary commercially available pressure-reduction valve, which can be adjusted with the aid of spring force. The embodiment of FIG. 2 differs from that of FIG. 1 in that, in the embodiment of FIG. 2, the flow of the pressing line 24 of the cylinder 20 travels entirely through the pressure valve 28. The pressure valve 28 includes a feedback line 54, which with the aid of its own pressure resists the pressure of the control line 38. When the saw motor 14 is rotating normally, the pressure of the control line 38 and the spring 39 causes a force, which is equal to the force caused by the pressure of the feedback line 54. Thus, the piston of the pressure valve 28 remains stationary and there is maximum pressure in the cylinder's pressing line 24. On the other hand, when the rotation of the saw motor 14 slows, the pressure in the control line 38 decreases and the pressure in the feedback line 54 forces the piston of the pressure valve 28 to move, when it gradually closes the connection leading to the pressing line 24 from the pressure valve 28. The pressure of the hydraulic cylinder 20 on the cutting flange 32 is then lightened and the revolutions of the saw motor 14 again increase to become normal.

The arrangement according to the invention is suitable for use in connection with various types of forest machines, particularly with harvester heads. The arrangement can also be applied to other corresponding applications, in which there is a dependency between the pressure of the cutting saw and the speed of rotation of the cutting saw. The arrangement is very economical to manufacture compared to solutions according to the prior art, as the arrangement can be implemented without electronic control. The operation of the arrangement is entirely mechanical and thus also operationally reliable.

In theory, the invention can also be applied in such a way that the pressure valve is installed on the cylinder's lifting line. In that case, when the saw motor slows down, the pressure before the throttle on the tank line increases and, with the aid of this pressure, the pressure valve on the lifting line is driven to a more closed position. This causes a pressure increase in the lifting line, which in turn lightens the cutting flange and the speed of rotation of the saw motor increases.

The invention claimed is:

1. A hydraulic arrangement in connection with a cutting saw having a cutting flange with an endless chain, the hydraulic arrangement comprising:
   a hydraulic input line,
   a hydraulic motor connected to the said hydraulic input line for operating the endless chain,
   a return line from the hydraulic motor,
   a hydraulic cylinder for pressing the cutting flange against a tree to be cut, having a piston rod and two sides,
   a feed line for pressing the hydraulic cylinder,
   a directional control valve located on the feed line of the hydraulic cylinder,
   a pressing line and a lifting line for guiding the flow from the said directional control valve to the hydraulic cylinder, guiding the flow as selected either to the side of the piston rod of the hydraulic cylinder or to the cylinder side,
   a pressure valve located in connection with the said pressing line and/or the lifting line for controlling the hydraulic cylinder on the basis of the speed of rotation of the hydraulic motor,
   wherein the hydraulic arrangement further comprising
   a throttle in the return line for throttling the flow exiting from the hydraulic motor, and
   a control line for leading pressure caused by the throttling of the return line to the pressure valve for controlling the pressure valve,
   wherein the feed line of the hydraulic cylinder is connected in parallel with feed line of the hydraulic motor to the input line.

2. The hydraulic arrangement according to claim 1, wherein the hydraulic arrangement comprises a pressure-reduction valve installed on the feed line of the hydraulic cylinder.

3. The hydraulic arrangement according to claim 2, wherein the nominal pressure of the said throttle is 30-65% of the regulating value of the said pressure-reduction valve.

4. The hydraulic arrangement according to claim 1, wherein the said directional control valve is located on the feed line of the hydraulic cylinder before the said pressure valve.

5. The hydraulic arrangement according to claim 1, wherein the pressure valve is arranged to open when the pressure decreases below a limit threshold in the return line of the hydraulic motor.

6. The hydraulic arrangement according to claim 1, wherein the volume flow to be directed to the feed line of the hydraulic cylinder is 5-30% of the total volume flow of the hydraulics input line.

7. The hydraulic arrangement according to claim 1, wherein the pressure in the feed line of the hydraulic cylinder is 15-35% of the pressure in the hydraulics input line.

8. The hydraulic arrangement according to claim 1, wherein the said pressure valve is a pressure-restriction valve, or a pressure-reduction valve.

9. The hydraulic arrangement according to claim 1, wherein the said pressure valve is a slide valve.

10. The hydraulic arrangement according to claim 1, wherein the said pressure valve is a poppet valve.

11. The hydraulic arrangement according to claim 1, wherein the said pressure valve is located between the said pressing line and the pressure side of the said throttle.

12. The hydraulic arrangement according to claim 1, wherein the said pressure valve is located between the said intermediate line, the said pressing line, and the pressure side of the said throttle.

* * * * *